(12) United States Patent
Willey

(10) Patent No.: US 6,974,175 B2
(45) Date of Patent: Dec. 13, 2005

(54) ACCESSORY MOUNTING SYSTEM

(76) Inventor: Barry Willey, 727 Ela Rd., Inverness, IL (US) 60067

( * ) Notice: Subject to any disclaimer, the term of this patent is extended or adjusted under 35 U.S.C. 154(b) by 0 days.

(21) Appl. No.: 10/762,739

(22) Filed: Jan. 22, 2004

(65) Prior Publication Data
US 2005/0161970 A1    Jul. 28, 2005

(51) Int. Cl.[7] .............................................. B62J 17/00
(52) U.S. Cl. .................. 296/78.1; 280/288.4
(58) Field of Search ..................... 296/78.1, 84.1, 296/77.1; 280/288.4, 152.1; 414/462; 224/413, 224/419, 400, 430, 448, 536

(56) References Cited

U.S. PATENT DOCUMENTS

| | | | | |
|---|---|---|---|---|
| 1,360,945 A | * | 11/1920 | Harley | 296/78.1 |
| RE23,039 E | * | 9/1948 | Comiskey, Sr. | 296/78.1 |
| 2,675,266 A | * | 4/1954 | Comiskey, Sr. | 296/78.1 |
| 2,903,297 A | * | 9/1959 | Zbikowski | 296/78.1 |
| 3,801,152 A | * | 4/1974 | Tims et al. | 296/78.1 |
| 4,082,345 A | * | 4/1978 | Willey | 296/78.1 |
| 4,168,098 A | * | 9/1979 | Willey | 296/78.1 |
| 4,269,445 A | * | 5/1981 | Gager, Jr. | 296/78.1 |
| 4,355,838 A | * | 10/1982 | Hickman | 296/78.1 |
| 4,379,584 A | | 4/1983 | Willey | |
| 4,489,973 A | * | 12/1984 | Willey | 296/78.1 |
| 5,338,059 A | | 8/1994 | Inoue | |
| 5,641,554 A | | 6/1997 | Koizumi | |
| 5,658,035 A | * | 8/1997 | Armstrong | 296/78.1 |
| 5,685,560 A | | 11/1997 | Sugiyama et al. | |
| 5,732,965 A | * | 3/1998 | Willey | 280/288.4 |
| 5,788,313 A | | 8/1998 | Willey | |
| 5,839,752 A | | 11/1998 | Yamasaki et al. | |
| 5,845,929 A | | 12/1998 | Schlett et al. | |
| 5,845,955 A | * | 12/1998 | Willey | 296/78.1 |
| 5,853,217 A | * | 12/1998 | Armstrong | 296/78.1 |
| 5,979,931 A | | 11/1999 | Totani et al. | |
| 6,042,140 A | | 3/2000 | Blazaitis et al. | |
| 6,123,482 A | * | 9/2000 | Keller | 403/384 |
| 6,196,614 B1 | * | 3/2001 | Willey | 296/78.1 |
| 6,234,554 B1 | | 5/2001 | Willey | |
| 6,254,166 B1 | * | 7/2001 | Willey | 296/78.1 |
| 6,257,362 B1 | * | 7/2001 | Scherbarth | 280/288.4 |
| 6,347,804 B1 | * | 2/2002 | Seibel | 280/288.4 |
| 6,484,914 B1 | * | 11/2002 | Willey | 224/413 |
| 6,736,441 B1 | * | 5/2004 | Barber et al. | 296/78.1 |

* cited by examiner

Primary Examiner—Kiran B. Patel
(74) Attorney, Agent, or Firm—Vedder Price Kaufman & Kammholz

(57) ABSTRACT

A readily removable accessory for a motorcycle or the like. The accessory is preferably a windshield and includes a pair of brackets. There is a vertical slot and a horizontal slot, defined by a pair of edges substantially parallel to each other. One of the edges has a slight projection extending toward the other, and there are two pairs of docking points. Each pair of docking points comprises a pair of flanged wheels with one flexible annular intermediate section. One wheel is insertable into one of the slots, and when the bracket is urged so as to place the other one of the wheels in its slots, the wheel undergoes a slight radial deflection after which it is strongly retained in the other slot.

19 Claims, 4 Drawing Sheets

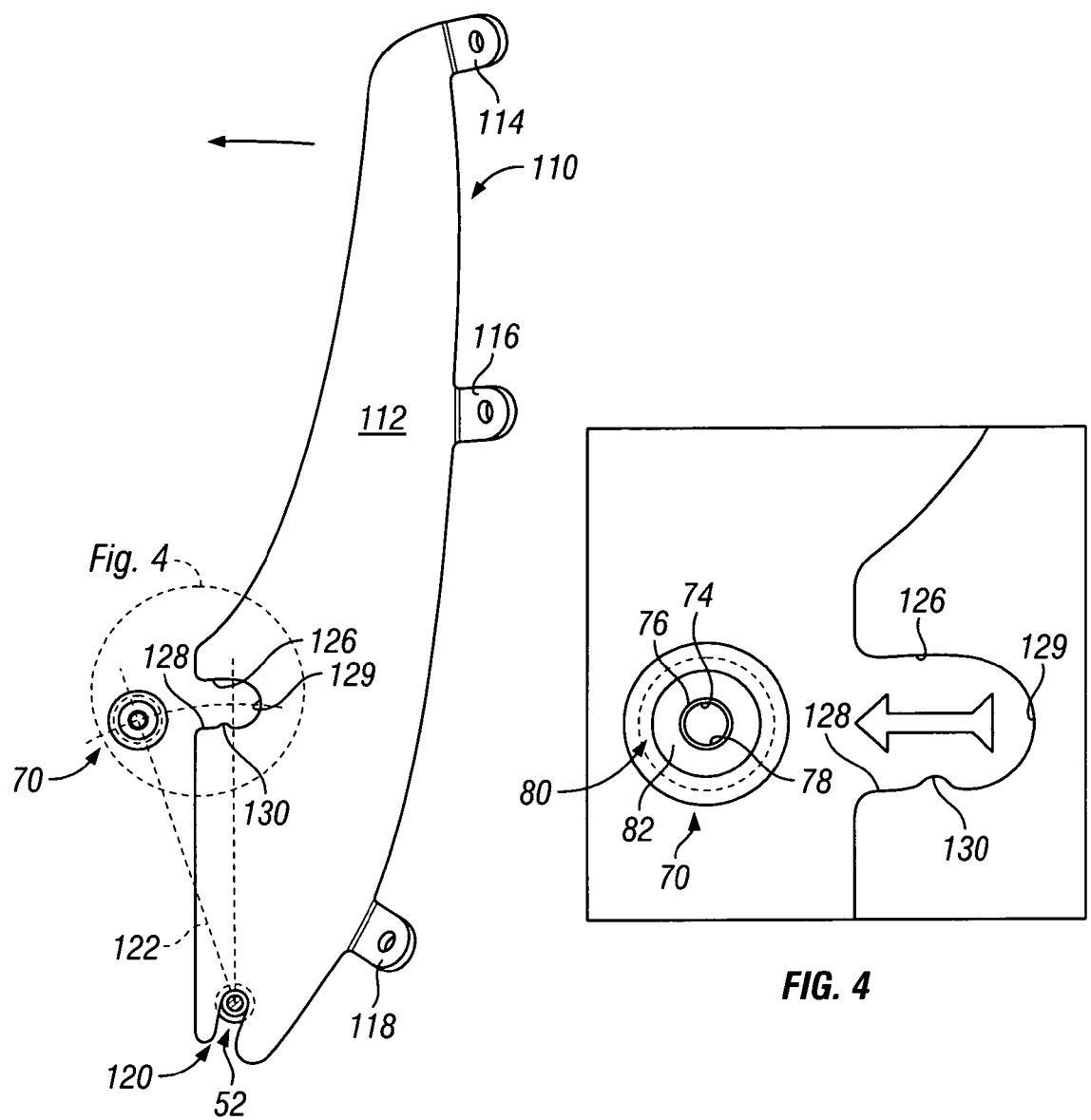
FIG. 3
FIG. 4
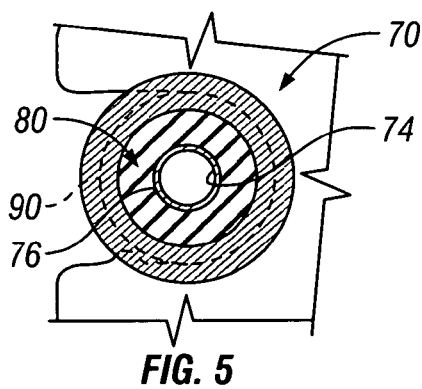
FIG. 5
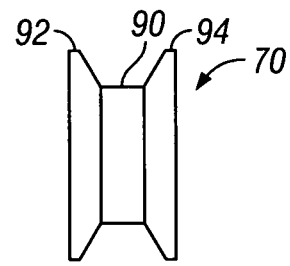
FIG. 6

ACCESSORY MOUNTING SYSTEM

BACKGROUND OF THE INVENTION

The present invention relates generally to motorcycle accessories and more particularly to a novel mounting system for windshields and other accessories. The invention particularly relates to a novel mounting system which is not only the ultimate in simplicity, but very effective in rapidly and easily mounting and dismounting motorcycle windshields and other accessories from the cycle.

Although there are many different mounting systems for motorcycle windshields and the like, it would be particularly advantageous to provide such a system wherein the shield may be reliably attached to and removed from the motorcycle in a matter of seconds. This would be particularly true wherein the mounting system could comprise four docking points permanently affixed to the cycle, but would not leave unsightly or bulky fastening means on the cycle when it is desired to use the cycle without the shield or other accessory.

When it comes time to mount or affix the accessory, this can be done in a minute or less by a person having almost no mechanical skill. For example, it would be highly desirable to provide an accessory for mounting windshields or other accessories, wherein the docking points could be affixed to the motorcycle and remain there permanently, while the shield itself and the two brackets for mounting it could be removed and stored as a unit without further disassembly. Particularly, it would be desirable if there were such a system wherein the docking points used to mount the shield could be affixed to the motorcycle and thereafter be allowed to remain there without distracting from the appearance or function thereof, and without presenting any ungainly elements or the like such as protruding screws, studs, brackets or braces. It would also be advantageous if a simple mounting system could be placed relatively permanently on the cycle which would enable the shield to be mounted by placing it downwardly on a pivot point and thereafter merely snapping it into place by a backward (in relation to the cycle) motion into a secured position.

It would also be desirable to make a shield which would be able to be removed by a much less strong, forwardly acting force, such as from the force of a rider being thrown forward in the event of an accident, whereby the shield would be detached rather than remaining in place and injuring the rider.

It would also be an advantage to provide such a system with a pair of clamps surrounding each fork tube which would be tightened merely by completing the installation of the mounting system, and not requiring additional tools to install the system. Such a system would not require any post-installation adjustment.

Accordingly, it is an object of the present invention to provide an improved mounting system for a windshield or the like.

Another object is to provide a unique mounting system wherein the mounting bracket on the shield includes a very small but definite projection or bump in the lower surface of the upper mounting slot to facilitate ready installation and latching.

A still further object of the invention is to provide a system which uses metal straps similar to hose claims or the like enabling a bracket holder to be mounted on the fork legs or the fork leg housing of the motorcycle.

Another object is to provide a mounting system adaptable to different sizes of mounting, merely by changing the straps which secure the bracket holders to the fork legs or the fork leg covers.

Another object is to provide a novel flanged mounting wheel, a urethane or other elastomeric or flexible middle section, an outer flanged section and optimally having a thin, hollow innermost sleeve, making a unique composite mounting wheel capable not only of rotating to ease installation but also allowing a limited amount of radial deflection as it is being installed.

A still further object is to provide a system which in one embodiment, includes a pair of straps, a mounting bracket holder including studs, a bracket cover unit and two shield or like accessory mounting wheels, each secured to the bracket holder by threaded fasteners.

A further object is to provide a mounting system for other accessories which would use the same or similar arrangement of bracket for mounting saddlebags or other accessories.

A still further object of the invention is to provide a simplified system of mounting and dismounting the desired accessory.

Another object is to provide a contoured cover for the straps surrounding the fork tubes securing the bracket holder to the tubes, whereby a finished appearance is maintained in the cycle.

A still further object is to provide a mounting system that is virtually foolproof in operation.

These and other objects of the invention are achieved in practice by providing, in one embodiment, a novel strap and mounting system for a specially designed accessory mounting bracket, said system including a pair of studs and a pair of flanged wheels or rollers, one of which may remain on a fixed axis but is rotatable and other which is not only rotatable but also able to undergo slight radial deformation or deflection under an applied load. The other embodiment does not use straps, but mounts the docking points directly on the fork tube covers.

The manner in which these and other objects and advantages are achieved in practice will become more apparent when considered in connection with the following description of the preferred embodiments of the invention and shown in the accompanying drawings, wherein like reference numbers indicate corresponding parts throughout.

BRIEF DESCRIPTION OF THE DRAWINGS

FIG. 3 is a side elevational view of the elements of the mounting system of the invention including the mounting bracket and the flanged wheels of the invention;

FIG. 4 is an enlarged fragmentary view of a portion of the mounting bracket and the upper flanged wheel;

FIG. 5 is a further enlarged vertical sectional view of the upper flanged wheel shown in FIGS. 3 and 4, and showing the wheel in its fully installed position within the windshield;

FIG. 6 is a front elevational view of the upper flanged wheel of FIG. 5;

DESCRIPTION OF THE PREFERRED EMBODIMENTS OF THE INVENTION

While the invention may be practiced in different ways and there will be room for modifications to be made by those skilled in the art, a brief description will be made of several preferred embodiments of the invention.

Figure 1:
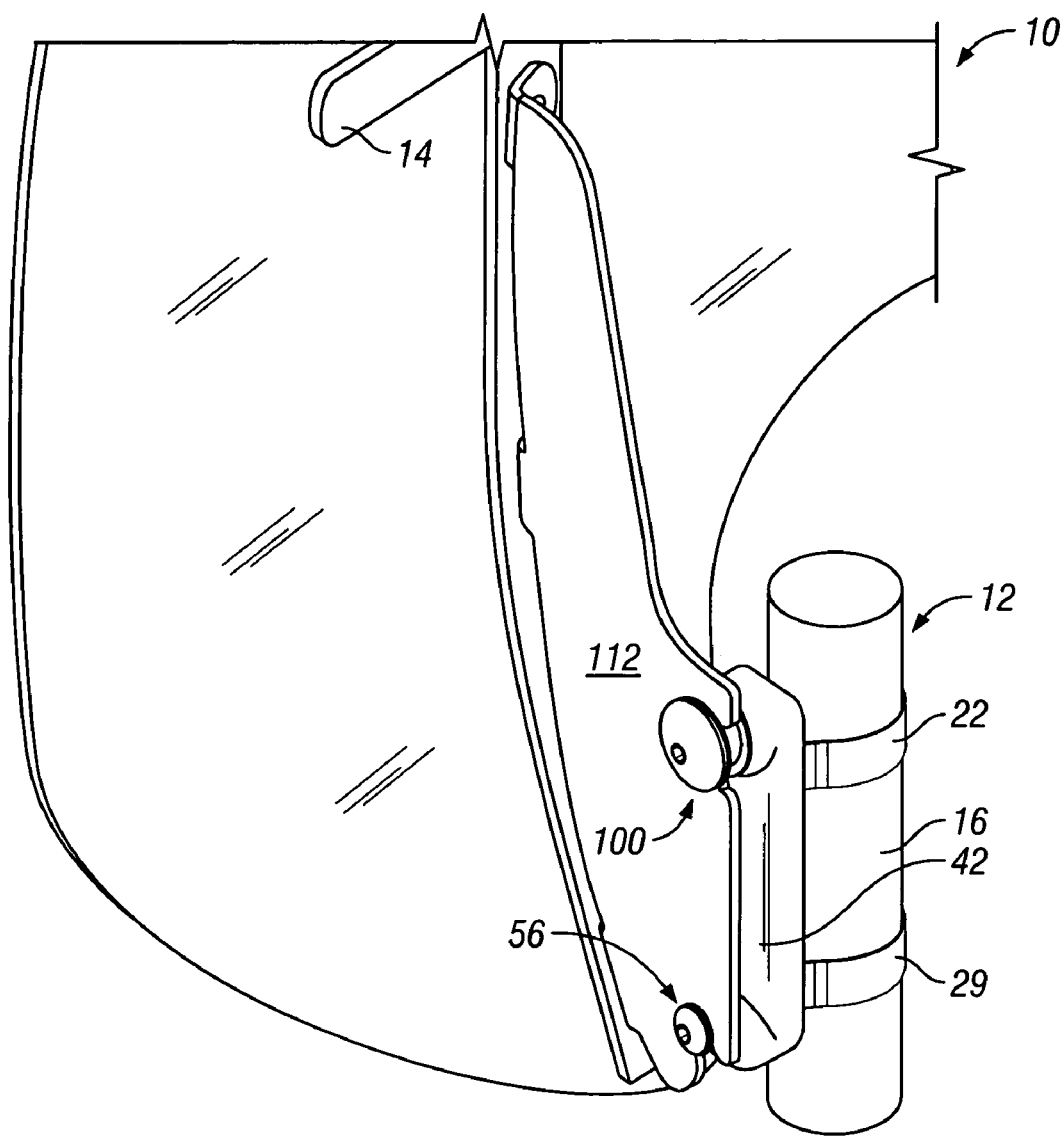
FIG. 1 is a rear perspective view showing a part of the windshield, the brackets and the bracket mounting means fitting over the fork tubes.
Figure 2:
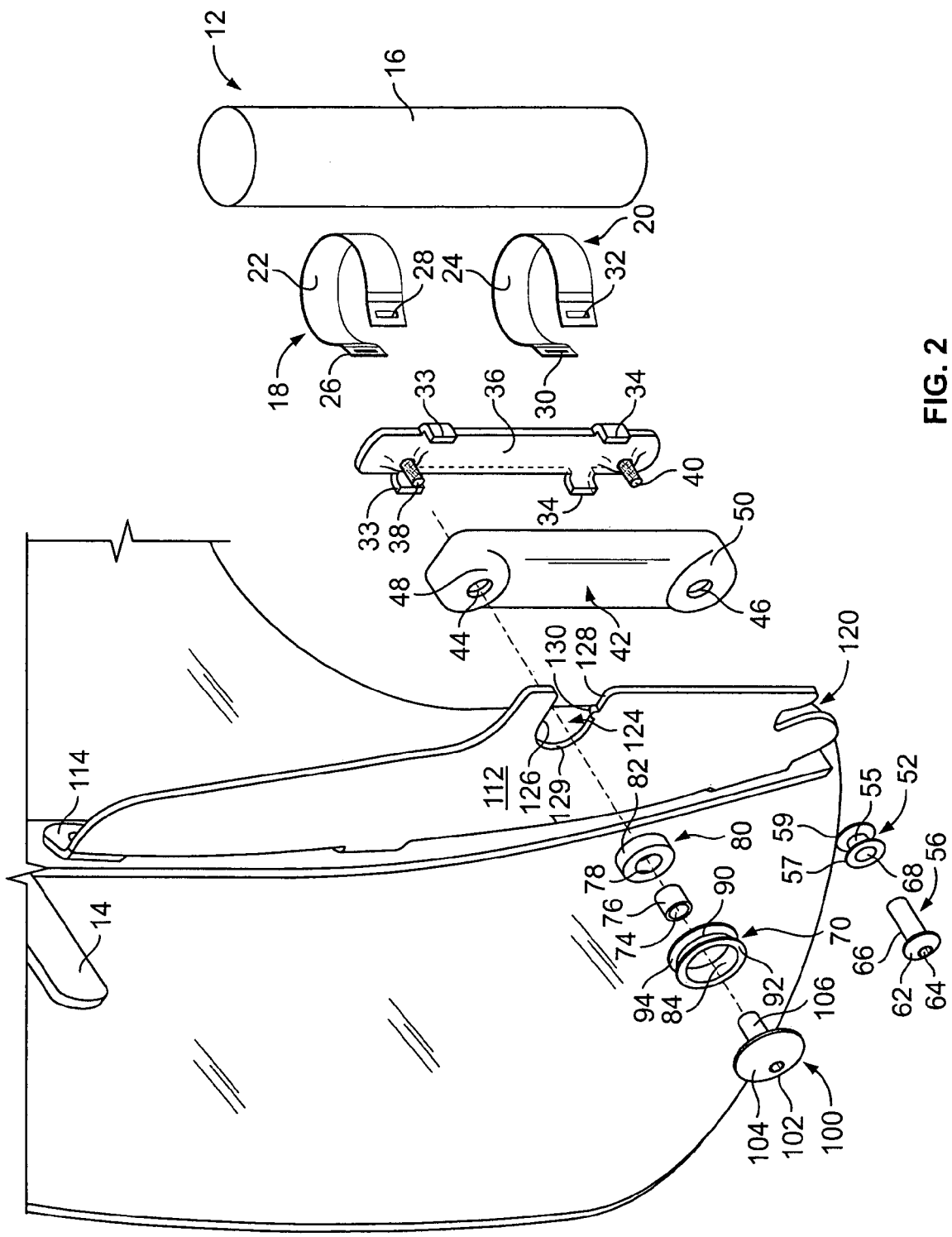
FIG. 2 is an exploded view showing the fork tubes, a pair of straps, a mounting bracket holder, a holder cover, a three piece flanged wheel and two mounting fasteners, as well as one of the shield mount brackets.

Referring now to the drawings in greater detail, there is shown a windshield generally designated 10 and shown to be affixed to a front portion of a motorcycle fork tube generally designated 12 in FIGS. 1 and 2. These views show the windshield generally designated 10, a windshield stiffener 14 and one fork leg 16 shown fragmentarily in FIG. 2; the front end structure of the cycle includes a second identical leg (not shown) arranged to form part of the so-called triple clamp of the motorcycle as is known to those skilled in the art. A pair of straps generally designated 18, 20 are shown, and each of these has a body portion 22, 24, pairs of openings 26, 28, 30, 32 for engaging pairs of upper ears 33 and lower ears 34 of the attachment backbone 36. The backbone 36 has welded to it an upper stud 38 and a lower stud 40. The backbone 36 is then secured to the fork tubes by means of placing the ears 33, 34 through the openings 26, 28, 30, 32 in the strap bodies 22, 24. The strap bodies 22, 24 will then be tightened as will be described later.

The backbone cover, generally designated 42, is then fit over the pair of studs 38, 40. Referring again to the backbone cover 42, the circular openings 44, 46 therein accommodate the studs 38, 40, and these openings 44, 46 are surrounded by flattened, circular areas 48, 50. The lower stud 40 extends through the lower opening 46 and receives a lower flanged wheel generally designated 52 and an internally threaded fastener, generally designated 56, which has a head portion 62 and a hexagonal opening 64 for receiving an allen wrench in the head portion 62. It also has an extended shank portion 66 for purposes which will be described. The small lower wheel 52 also includes a center trough 55 and flanges 57, 59 to either side thereof.

The lower flanged wheel 52 has a central opening 68 for passage of the shank 66 therethrough so that the shank can rest on, and caused to be exerted an axial compressive force on the circular area 50 of the backbone cover 42. The lower wheel 52 is therefore firmly mounted for rotation about the shank 66 of the nut 62.

The upper stud 38 passes through the opening 44 and extends into a multi-piece top flanged wheel assembly generally designated 70. The stud 38 is surrounded by a steel sleeve 76 having a central opening 74 therein. The sleeve 76 fits snugly on the inside diameter 78 of a urethane or like rubberized bushing generally designated 80, leaving the outside diameter 82 of the urethane bushing to fit snugly into the inside diameter 84 of the upper flanged wheel generally designated 70. The outside diameter of the upper flanged wheel 70 includes a center trough 90 flanked by two flanges 92, 94.

A fastener generally designated 100 includes a hexagonal opening 102 for an allen wrench or like tool (not shown), in an enlarged head 104 and a reduced diameter shank portion 106 which is sized to fit exactly through the inside diameter 74 of the sleeve 76. The shank 106 bears on the circular area 48 of the backbone cover 42 so the stud can pull the straps 22, 24 tight by pulling the cover against the strap bodies 22, 24 and thus pulling the strap bodies 22, 24 against the fork tube 12.

The upper and lower wheels 70, 52 and the various parts used to position them are all collectively referred to as "docking points", since the windshield fastens to them. It will thus be seen that when the docking points are affixed to the cycle, the only visible portions of these parts of the system are the wheels 52, 70, their needed fasteners 56, 100, and the clamps 18, 20, whose ends are shrouded by the cover 42. The two wheels and their fasteners are very smooth and streamlined, thus present an inconspicuous but finished appearance to the motorcycle.

The sleeve 76, urethane bushing 80 and flanged wheel 70 are formed as an integrated unit in one embodiment, with the urethane bushing 80 being optionally bonded to both the sleeve 76 and the flanged wheel 70, the inside and outside diameters 78, 82 of the urethane bushing being the affected parts. In the alternative, the sleeve 76 may be press fit into the urethane bushing 80 which is fastened to the wheel 70.

Referring now to FIGS. 3–6, there is shown a windshield mounting bracket generally designated 110 and shown to include a main body portion 112, and a plurality of ears 114, 116 and 118, one of which may also be attached to the stiffener 14. In addition, and very importantly, the bracket 110 (whose mirror image is on the other side of the windshield assembly) has a generally upwardly extending slot generally designated 120 near the bottom of the bracket 112, and an upper, generally horizontally extending slot generally designated 124. The nearly horizontal slot 124 is defined by an upper, slightly arcuate line segment 126 and a lower slightly arcuate line segment 128 with the two segments being substantially parallel to each other. The two segments are joined by a circular arcuate surface 129, and importantly, by a very small projection or bump 130. The bump 130 keeps the upper wheel in contact with the circular arcuate surface 129, and provides resistance to escape of the wheel 70 once it is in place. The bump 130, although small, also provides substantial resistance during positioning the shield when it is being installed. As can be seen, the arcuate surfaces 126, 128 are formed with their centers about the center of the lower wheel 52. The upper wheel 70 moves on radius line 122 during installation.

An important feature of the invention is the manner in which the urethane elastomer or other flexible part of the flanged wheel undergoes deflection in response to contracting the bump 130. This is a seating force, measured at the top of the windshield of about 30–35 pounds. Once seated, the windshield resists a rearward deflection of a much greater force. It will release at about 30–35 pounds of forward force, thus constituting a safety feature.

Figure 7:
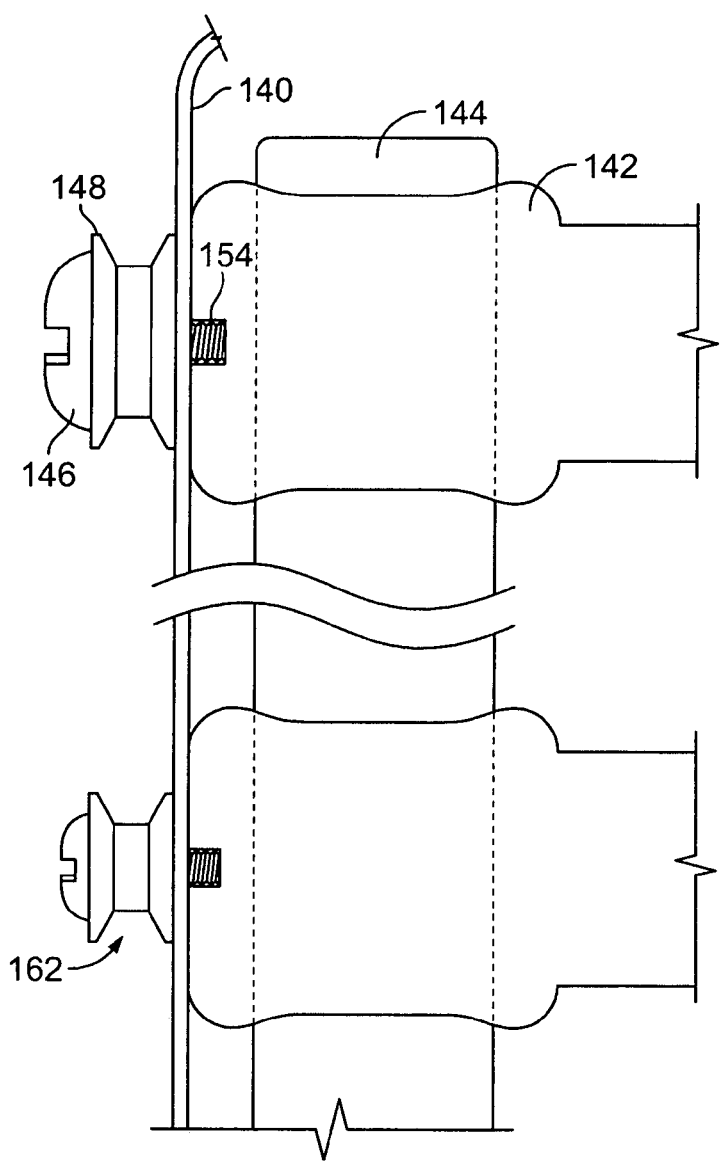
FIG. 7 is a fragmentary view of another form of mounting system for the shield, wherein the fasteners mounting the flanged wheels pass through an opening in the fork covers and are bolted directly into the triple clamps of the cycle.
Figure 8:
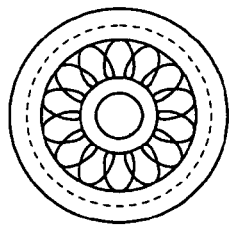
FIG. 8 shows an inclined garter spring used as a flexible element in the wheel.
Figure 9:
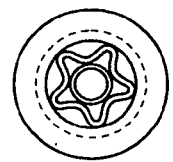
FIG. 9 shows another altered form of the flexible element of the wheel.
Figure 7A:
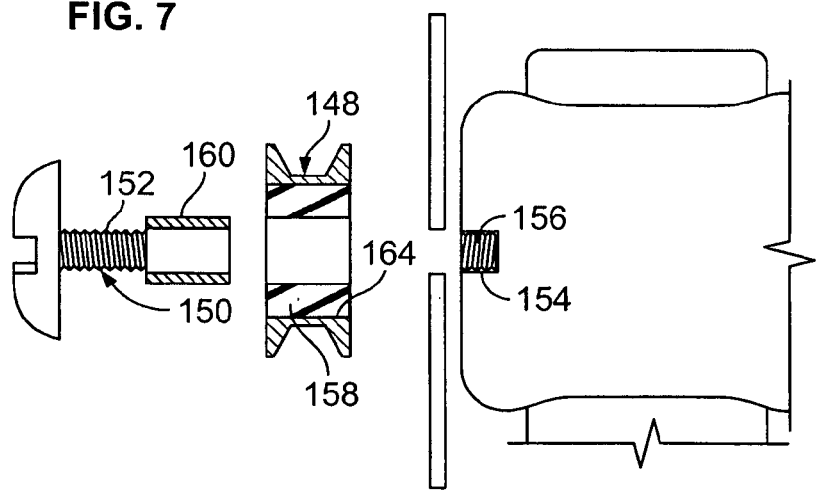
FIG. 7A is an exploded view of the upper mounting wheel, the fastener, the fork cover, and showing a tapped opening in the triple clamp holding the fork leg.

Referring now to FIGS. 7–7A, there is shown an embodiment in which, rather than having a stud protrude from the fork legs, and mounting the docking points, the docking points are attached directly to the fork tube cover 140 and also to the triple clamp 142 holding the fork tubes 144.

The headed fasteners 146 pass through the flanged wheel 148 and the fasteners contain a shank 150 with very fine threads 152. The triple clamps 142 have openings 154 which are tapped as at 156 to receive the shanks 150 of the fasteners 146. For this reason, the fork tube covers 140 have openings therein. Therefore, the fork covers 140 are held in place between the wheels 148 and the triple clamps 142. The wheels 148 have the urethane flexible annular intermediate section 158 and optionally, the sleeve 160. The lower wheel 162 attaches in a similar manner.

As in the other embodiments, a sleeve 160 may slide into the flexible annular intermediate section 158 of each wheel 148 with a press fit, or may be bonded thereto. The flexible, annular intermediate section 158 may in turn be bonded to the inside diameter 164 of the wheel 148. In this arrangement, the wheels 148, 162 may be spaced somewhat farther apart, perhaps as much as 8–10 inches, than their counterparts in the earlier example.

The shield is affixed to brackets in the same way, and is installed in the same way.

Referring now to another variation or embodiment of the invention, accessories of another kind, such as saddlebags, for example, may be mounted and dismounted with equal ease in this way. In this case, the bracket mounting the saddlebags is disposed in a generally horizontal plane. One would use the two docking points on either side of the apparatus, with the docking points being affixed directly to a fender brace, for example. Thereupon, the two docking points being spaced apart, one would cause the smaller wheels to enter the smaller, horizontal slot, whereas the other or larger docking point would engage the generally vertical slot. With the apparatus then being pushed downwardly, the apparatus would then be positioned snugly. The lifting force required to remove the apparatus would normally be of the same order as in the other case, say 30 to 40 pounds. If an additional fastening apparatus is needed, for example, a claw-type unit such as disclosed in U.S. Pat. No. 6,484,914 could be used. However, the convenience of using this type of apparatus for moderate installation force applications would more than justify its use. The ease of applying the accessory is accounted for by the fact that the larger wheels are preferably rotatable and somewhat elastic in their mid-section, and yet retain their integrity. The smaller wheels are desirably also rotatable, but the smaller wheel need not, strictly speaking, be rotatable.

It is important that the shield provides security against inertial forces resulting from road shock, etc. By placing the slots in the position shown, the jarring of the cycle owing to irregularities in the road, etc., are generally vertical, and are resisted by the solid portion of the bracket. The shield is preferably installed at a ten to twenty degree inclination from the vertical, although this is not strictly necessary.

It is possible for something other than an elastomer to be used as the core of the wheel. Thus, a series of inclined spokes 200 or the like could be placed in the core of the wheel, or a sinuous spring, for example, a garter spring 202 that is inclined somewhat so as to deflect a small amount on the application of a force could also be used. The stiffness of the elastomer should be taken into account with a durometer of about 70 to about 95, with about 90 being preferred. Obviously, the invention is suitable to be practiced not only with motorcycles, but also with so-called "motor driven cycles", mopeds, motor scooters, ATCs (all terrain cycles), or ATVs (all terrain vehicles). This is what is meant by the expression "motorcycle or the like" as used herein. Other variations will occur to those skilled in the art and such may be made without departing from the spirit of the invention or the scope of the appended claims.

What is claimed is:

1. A readily removable windshield assembly for a motorcycle or the like, comprising, in combination, a shield element having a portion capable of being seen through, a pair of brackets affixed to said shield, each of said brackets, in position of use, including a first slot near the bottom thereof and facing in a first direction and a second slot having an opening facing in a second direction, said second slot having first and second edges substantially parallel to each other, one of said edges having a slight projection extending toward the other edge, and two pairs of docking points fixed in relation to said motorcycle or the like, each pair comprising a first element sized to fit snugly within said first slot, and a second element including a flanged member having axially inner and outer flanges surrounding a central trough for mating with said second slot, and a stiff but flexible annular portion lying radially inside said trough said first element being positionable within said first slot and said flanged member being insertable snugly into said second slot, so that when said brackets are moved toward a fastened position, said movement causes said stiff but flexible portions of said flanged members to deflect in response to contact of said flanged members with said projections and then move into a strongly retained position of said shield.

2. The windshield assembly as defined in claim 1 wherein said brackets are separately formed from said shield and are fixedly attached thereto.

3. The windshield assembly as defined in claim 1 wherein said second slot has its two edges joined to each other by a circular arcuate segment substantially parallel to the curvature of said trough.

4. The windshield assembly as defined in claim 1 wherein said docking points each comprise a pair of clamps holding a bracket holder, a pair of studs extending from said bracket holder, a cover for said bracket holder, and headed fasteners retaining a pair of flanged wheels between the bracket holder and the heads of said fasteners.

5. The windshield assembly as defined in claim 1 wherein said docking points each comprise a pair of headed fasteners having their shank portions fastened directly to the fork tube covers of an associated cycle.

6. The windshield assembly as defined in claim 1 wherein said first lower element comprises a rotatable wheel.

7. The windshield assembly as defined in claim 1 wherein said flexible annular portion of said second element comprises an elastomer bonded to said wheel.

8. The windshield assembly as defined in claim 7 wherein said elastomer is a urethane rubber.

9. The windshield assembly as defined in claim 8 wherein said urethane rubber has a durometer value of about 75 to about 95.

10. The windshield assembly as defined in claim 7 wherein a tubular metal sleeve lies inside said annular portion of said second element.

11. The windshield assembly as defined in claim 1 wherein said flexible annular portion comprises a garter spring lying inside said rotatable wheel.

12. The windshield assembly as defined in claim 1 wherein said first and second directions are different from each other.

13. The windshield assembly as defined in claim 1 wherein said second element is a rotary wheel.

14. The windshield assembly as defined in claim 1 wherein said first element is a rotary wheel.

15. A readily removable accessory for a motorcycle or the like, comprising, in combination, an accessory element, a pair of brackets forming a part of said element, said brackets each including a first slot near one end of said bracket and a second slot in said bracket, said second slot having first and second edges lying substantially parallel to each other and joined at their inner ends, one of said edges having a slight projection extending toward the other edge, and two pairs of docking points, each pair comprising a first portion attached to a portion of said motorcycle or the like and a second portion attached to a spaced apart portion of said motorcycle or the like, said first portion being snugly positionable within said first slot, and said second portion having axially inner and outer flanges surrounding a central trough, and a stiff but flexible annular portion lying radially inwardly of said trough, said second portion being snugly insertable into said second slot and, when said bracket is urged so as to place said second portion fully into said slot, said second portion, just before being fully seated, undergoing a slight radial deflection in response to said urging, said accessory element being thereafter strongly retained in its seated position.

16. The accessory as defined in claim 15 wherein said brackets are separately formed of metal and affixed in use to said accessory element.

17. The accessory as defined in claim 15 wherein said edges are joined by a circular arcuate segment.

18. The accessory as defined in claim 15 wherein said stiff but flexible annular intermediate portion comprises a urethane rubber.

19. The accessory as defined in claim 15 wherein said stiff but flexible annular intermediate portion comprises a garter spring.

* * * * *